(12) United States Patent
Chen

(10) Patent No.: US 10,755,448 B2
(45) Date of Patent: Aug. 25, 2020

(54) METHOD FOR MIXED COLOR CORRECTION

(71) Applicant: GUANGZHOU YAJIANG PHOTOELECTRIC EQUIPMENT CO., LTD., Guangzhou, Guangdong (CN)

(72) Inventor: Zhiman Chen, Guangdong (CN)

(73) Assignee: GUANGZHOU YAJIANG PHOTOELECTRIC EQUIPMENT CO., LTD., Guangzhou (CN)

( * ) Notice: Subject to any disclaimer, the term of this patent is extended or adjusted under 35 U.S.C. 154(b) by 0 days.

(21) Appl. No.: 16/263,366

(22) Filed: Jan. 31, 2019

(65) Prior Publication Data

US 2019/0164316 A1 May 30, 2019

Related U.S. Application Data

(63) Continuation-in-part of application No. PCT/CN2018/084903, filed on Apr. 27, 2018.

(30) Foreign Application Priority Data

Mar. 24, 2017 (CN) .......................... 2017 1 0183640

(51) Int. Cl.
*H04N 9/68* (2006.01)
*G06T 11/00* (2006.01)
*H05B 45/20* (2020.01)
*H05B 47/10* (2020.01)

(52) U.S. Cl.
CPC ............ *G06T 11/001* (2013.01); *H05B 45/20* (2020.01); *H05B 47/10* (2020.01); *H04N 9/68* (2013.01)

(58) Field of Classification Search
CPC ........... G06T 7/90; G06T 11/001; H04N 1/60; H04N 9/68; G09G 5/02
See application file for complete search history.

(56) References Cited

U.S. PATENT DOCUMENTS

2015/0312540 A1* 10/2015 Tuna ...................... H04N 9/646
348/223.1

* cited by examiner

*Primary Examiner* — Antonio A Caschera

(57) ABSTRACT

A method for mixed color correction is provided. Based on the variations of the chromaticity coordinates required for adjusting between the target color and the actually-measured color, variations of illuminances of one or two of RGB of the three colors are calculated for adjusting the actually-measured color to achieve the variations of the chromaticity coordinates required for adjusting according to the correlation between the chromaticity coordinates and the tristimulus values, until the required variations of chromaticity coordinate are within a required range. This method can quickly and accurately correct and adjust the actually-measured color, guarantee the consistency of lamp colors, and is convenient for application.

9 Claims, 1 Drawing Sheet

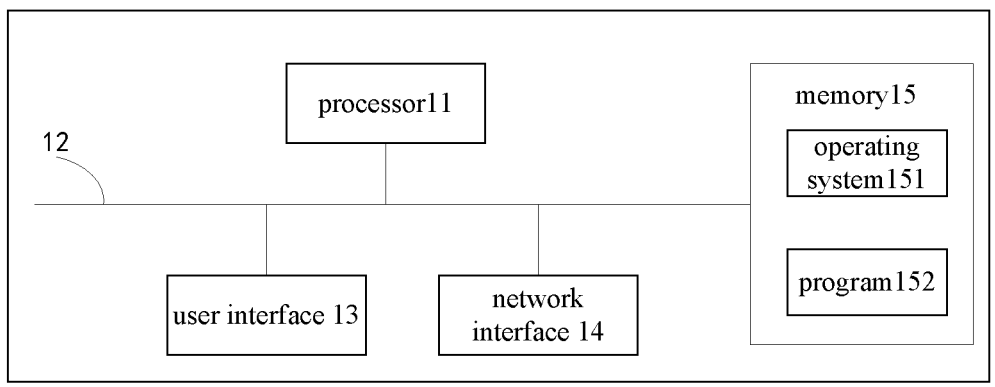

METHOD FOR MIXED COLOR CORRECTION

CROSS-REFERENCE TO RELATED APPLICATIONS

The present application is a Continuation-in-part Application of PCT application No. PCT/CN2018/084903 filed on Apr. 27, 2018, which claims the priority of Chinese patent application No. 201710183640.4 filed on Mar. 24, 2017. The contents of the above are hereby incorporated by reference.

FIELD OF THE INVENTION

The present invention relates to the field of color management control, and in particular relates to a method for mixed color correction which can be applied to luminaires of multiple color light sources.

BACKGROUND OF THE INVENTION

So far, different colors are required for luminaires of multiple color light sources, so engineers have to unremittingly test and adjust to obtain the right color. Once the obtained color is different from the target color, it would be in need of further re-adjusting, which costs too much labor and materials. In the lamp applications, the colors of the different lamps that are designed to be with the same color in one enterprise vary widely, therefore the color consistency cannot be guaranteed, which makes it difficult to apply.

SUMMARY OF THE INVENTION

The present invention seeks to resolve these issues by introducing methods for mixed color correction, which can correct and adjust the actually-measured color quickly and accurately, realizes the color consistency of the luminaries, and is convenient.

To solve these problems, the present invention is directed to a method for mixed color correction, including the following steps:

S100, receiving chromaticity coordinate information of a target color and a actually-measured color; calculating chromaticity coordinate differences between the target color and the actually-measured color, calculating a first ratio of an ordinate difference value to an abscissa difference value of the chromaticity coordinate differences, storing the chromaticity coordinate differences and the first ratio of the ordinate difference value to the abscissa difference value;

S200, determining whether the chromaticity coordinate differences are within a pre-stored difference range;

S300, terminating the correction when the chromaticity coordinate differences are within the pre-stored difference range;

S400, performing steps S401-S404 below when at least one of the chromaticity coordinate differences is not within the pre-stored difference range;

S401, calculating corresponding variations of chromaticity coordinates and a second ratio of an ordinate variation value to an abscissa variation value of the variations of the chromaticity coordinates respectively when an illuminance of each color of RGB is adjusted according to the received chromaticity coordinates and illuminances of the RGB of the actually-measured color; wherein, the second ratios of the ordinate values to the abscissa values of the variations of the chromaticity coordinates comprise a first value of R color, a second value of G color and a third value of B color;

S402, comparing the first ratio of the ordinate difference value to the abscissa difference value with the first value, the second value and the third value respectively;

S403, calculating an illumination adjustment value corresponding to an equal value for achieving the target color when at least one of the first value, the second value and the third value is equal to the first ratio of the ordinate difference value to the abscissa difference value, correcting the actually-measured color based on the illumination adjustment value; returning to step S100; and S404, calculating a sum of absolute values of illumination adjustment values of any two colors of the RGB for achieving the target color respectively when none of first value, the second value and the third value is equal to the first ratio of the ordinate difference value to the abscissa difference value to generate three sums of the absolute values; correcting the actually-measured color by choosing a smallest sum from the three sums of the absolute values, returning to step S100.

Preferably, the first value of the R color and the illumination adjustment value of the R color for achieving the target color are given as follows:

$$Kr = \frac{\Delta y1}{\Delta x1} = \frac{y1 * \beta 1'}{x1 * \beta 1}$$

$$\Delta E1 = -\frac{\Delta x1 * E2 * a1^2}{x1 * \beta 1 + a1 * \Delta x1} \text{ or}$$

$$\Delta E1 = -\frac{\Delta y1 * E2 * a1^2}{y1 * \beta 1' + a1 * \Delta y1}$$

wherein Kr represents the first value, $\Delta E1$ represents the illumination adjustment value of the R color for achieving the target color; $(\Delta x1, \Delta y1)$ are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2), and B (E3);

$$\beta 1' = 1 - A2 + K1 - K1 * A3,$$

$$\beta 1 = (B2 - 1) * A2 + (B3 - 1) * A3 * K1,$$

$$a1 = \frac{1}{C2} + A2 + K1 * A3,$$

$$A2 = \frac{y1}{y2},$$

$$A3 = \frac{y1}{y3},$$

$$B2 = \frac{x2}{x1},$$

$$B3 = \frac{x3}{x1},$$

$$K1 = \frac{C3}{C2},$$

$$C2 = \frac{E2}{E1}, \text{ and}$$

$$C3 = \frac{E3}{E1}.$$

Preferably, the second value of the G color and the illumination adjustment value of the G color for achieving the target color are given as follows:

$$Kg = \frac{\Delta y2}{\Delta x2} = \frac{y1 * \beta 2'}{x1 * \beta 2}$$

$$\Delta E2 = \frac{\Delta x2 * E1 * a2^2}{x1 * \beta 2 * (a2 - A2 * C2) - a2 * A2 * \Delta x2} \text{ or}$$

$$\Delta E2 = \frac{\Delta y2 * E1 * a2^2}{y1 * \beta 2'(a2 - A2 * C2) - a2 * A2 * \Delta y2}$$

wherein Kg represents the second value, ΔE2 represents the illumination adjustment value of the G color for achieving said target color; (Δx2, Δy2) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$A2 = \frac{y1}{y2},$$

$$A3 = \frac{y1}{y3},$$

$$B2 = \frac{x2}{x1},$$

$$B3 = \frac{x3}{x1},$$

$$C2 = \frac{E2}{E1},$$

$$C3 = \frac{E3}{E1},$$

$$\beta 2' = 1 - A2 * K2',$$

$$\beta 2 = B2 * A2 - K2 * A2,$$

$$a2 = 1 + A3 * C3 + A2 * C2,$$

$$K2 = \frac{1 + A3 * B3 * C3}{1 + A3 * C3},$$

$$K2' = \frac{1 + C3}{1 + A3 * C3} \text{ and}$$

$$K1 = \frac{C3}{C2}.$$

Preferably, the third value of B color and the illumination adjustment value of the B color for achieving the target color are given as follows:

$$Kb = \frac{\Delta y3}{\Delta x3} = \frac{y1 * \beta 3'}{x1 * \beta 3}$$

$$\Delta E3 = \frac{\Delta x3 * E1 * a3^2}{x1 * \beta 3 * (a3 - A3 * C3) - a3 * A3 * \Delta x3} \text{ or}$$

$$\Delta E3 = \frac{\Delta y3 * E1 * a3^2}{y1 * \beta 3' * (a3 - A3 * C3) - a3 * A3 * \Delta y3}$$

wherein Kb represents the third value, ΔE3 represents the illumination adjustment value of B color for achieving said target color; (Δx3, Δy3) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$A2 = \frac{y1}{y2},$$

$$A3 = \frac{y1}{y3},$$

$$B2 = \frac{x2}{x1},$$

$$B3 = \frac{x3}{x1},$$

$$C2 = \frac{E2}{E1},$$

$$C3 = \frac{E3}{E1},$$

$$\beta 3' = 1 - A3 * K3',$$

$$\beta 3 = B3 * A3 - A3 * K3,$$

$$a3 = 1 + A3 * C3 + A2 * C2,$$

$$K3' = \frac{1 + C2}{1 + A2 * C2},$$

and $$K3 = \frac{1 + A2 * B2 * C2}{1 + A2 * C2}.$$

Preferably, when color R and color G are selected for adjusting illuminances in step S404, the illumination adjustment values of the color R and color G are given as follows:

$$\Delta Eb1 = -\frac{f(\Delta Eb1) * a1^2 * E2}{x1 * \beta 1 + f(\Delta Eb1) * a1}$$

$$\Delta Eb2 = \frac{f(\Delta Eb2) * a2^2 * E1}{x1 * \beta 2 * (a2 - A2 * C2) - f(\Delta Eb2) * a2 * A2}$$

wherein ΔEb1 represents an illumination adjustment value of the R color, ΔEb2 represents an illumination adjustment value of the G color, $$f(\Delta Eb1) = \frac{\Delta y - \Delta x * Kg}{Kr - Kg}, f(\Delta Eb2) = \frac{\Delta y - \Delta x * Kr}{Kg - Kr},$$

(Δx, Δy) represent variations of chromaticity coordinates required for adjusting between the target color and the actually-measured color;

$$a1 = \frac{1}{C2} + A2 + K1 * A3,$$

$$\beta 1 = (B2 - 1) * A2 + (B3 - 1) * A3 * K1,$$

$$a2 = 1 + A3 * C3 + A2 * C2,$$

$$\beta 2 = B2 * A2 - K2 * A2,$$

$$A2 = \frac{y1}{y2},$$

$$A3 = \frac{y1}{y3},$$

$$B2 = \frac{x2}{x1},$$

$$B3 = \frac{x3}{x1},$$

$$K1 = \frac{C3}{C2},$$

$$C2 = \frac{E2}{E1},$$

$$C3 = \frac{E3}{E1} \text{ and}$$

$$K2 = \frac{1 + A3 * B3 * C3}{1 + A3 * C3}.$$

Preferably, when color R and color B are selected for adjusting illuminances in step S404, the illumination adjustment values of the color R and color B are given as follows:

$$\Delta Eg1 = -\frac{f(\Delta Eg1) * a1^2 * E2}{x1 * \beta1 + f(\Delta Eg1) * a1}$$

$$\Delta Eg3 = \frac{f(\Delta Eg3) * a3^2 * E1}{x1 * \beta3 * (a3 - A3 * C3) - f(\Delta Eg3) * a3 * A3}$$

wherein ΔEg1 represents an illumination adjustment value of the R color, ΔEg3 represents an illumination adjustment value of the B color, $$f(\Delta Eg1) = \frac{\Delta y - \Delta x * Kb}{Kr - Kb}, f(\Delta Eg3) = \frac{\Delta y - \Delta x * Kr}{Kb - Kr},$$

(Δx, Δy) represent variations of chromaticity coordinates required for adjusting between the target color and the actually-measured color;

$$a1 = \frac{1}{C2} + A2 + K1 * A3,$$

$$a3 = 1 + A3 * C3 + A2 * C2,$$

$$\beta1 = (B2 - 1) * A2 + (B3 - 1) * A3 * K1,$$

$$\beta3 = B3 * A3 - A3 * K3,$$

$$A2 = \frac{y1}{y2},$$

$$A3 = \frac{y1}{y3},$$

$$B2 = \frac{x2}{x1},$$

$$B3 = \frac{x3}{x1},$$

$$K1 = \frac{C3}{C2},$$

$$C2 = \frac{E2}{E1} \text{ and}$$

$$C3 = \frac{E3}{E1}.$$

Preferably, when color G and color B are selected for adjusting illuminances in step S404, the illumination adjustment values of the color R and color B are given as follows:

$$\Delta Er2 = \frac{f(\Delta Er2) * a2^2 * E1}{x1 * \beta2 * (a2 - A2 * C2) - f(\Delta Er2) * a2 * A2}$$

$$\Delta Er3 = \frac{f(\Delta Er3) * a3^2 * E1}{x1 * \beta3 * (a3 - A3 * C3) - f(\Delta Er3) * a3 * A3}$$

wherein, ΔEr2 represents an illumination adjustment value of the G color, ΔEr3 represents an illumination adjustment value of the B color, $$f(\Delta Er2) = \frac{\Delta y - \Delta x * Kb}{Kg - Kb}, f(\Delta Er3) = \frac{\Delta y - \Delta x * Kg}{Kb - Kg},$$

(Δx, Δy) represent variations of chromaticity coordinates required for adjusting between the target color and the actually-measured color;

$$a2 = 1 + A3 * C3 + A2 * C2,$$

$$a3 = 1 + A3 * C3 + A2 * C2,$$

$$\beta2 = B2 * A2 - K2 * A2,$$

$$\beta3 = B3 * A3 - A3 * K3,$$

$$A2 = \frac{y1}{y2},$$

$$A3 = \frac{y1}{y3},$$

$$B2 = \frac{x2}{x1},$$

$$B3 = \frac{x3}{x1},$$

$$K1 = \frac{C3}{C2},$$

$$C2 = \frac{E2}{E1},$$

$$C3 = \frac{E3}{E1} \text{ and}$$

$$K3 = \frac{1 + A2 * B2 * C2}{1 + A2 * C2}.$$

Preferably, the pre-stored range of the chromaticity coordinate difference stored in the second storage location is ±0.002.

The present invention herein further include a terminal apparatus, comprising a processor, a memory, and a computer program stored in said memory and configured to be executed by the processor, wherein the above mentioned method for mixed color correction is implemented when the processor executes the computer program.

Compared with the prior art, the beneficial effects of this invention are set out as follows.

Since an unique color is defined by the chromaticity coordinates, the color is accurate, and the color consistency is guaranteed. Based on the known chromaticity coordinates of various colors and the chromaticity coordinate differences between the current color and the target color, the mixed color is more similar with the target color by calculating and adjusting the illuminances of one or two colors. Generally, the target color can be achieved by 2-3 calculations during the adjustment process, which is simple and fast.

BRIEF DESCRIPTION OF DRAWINGS

The single FIGURE is a schematic view of the apparatus for mixed color correction according to one embodiment of the present invention.

DETAILED DESCRIPTION OF ILLUSTRATED EMBODIMENTS

The present invention is directed to a method for mixed color correction, including the following steps:

S100, receiving chromaticity coordinate information of a target color and a actually-measured color; calculating chromaticity coordinate differences between the target color and the actually-measured color, calculating a first ratio of an ordinate difference value to an abscissa difference value of the chromaticity coordinate differences, storing the chromaticity coordinate differences and the first ratio of the ordinate difference value to the abscissa difference value;

S200, determining whether the chromaticity coordinate differences are within a pre-stored difference range;

S300, terminating the correction when the chromaticity coordinate differences are within the pre-stored difference range;

S400, performing steps S401-S404 below when at least one of the chromaticity coordinate differences is not within the pre-stored difference range;

S401, calculating corresponding variations of chromaticity coordinates and a second ratio of an ordinate variation value to an abscissa variation value of the variations of the chromaticity coordinates respectively when an illuminance of each color of RGB is adjusted according to the received chromaticity coordinates and illuminances of the RGB of the actually-measured color; wherein, the second ratios of the ordinate values to the abscissa values of the variations of the chromaticity coordinates comprise a first value of R color, a second value of G color and a third value of B color;

S402, comparing the first ratio of the ordinate difference value to the abscissa difference value with the first value, the second value and the third value respectively;

S403, calculating an illumination adjustment value corresponding to an equal value for achieving the target color when at least one of the first value, the second value and the third value is equal to the first ratio of the ordinate difference value to the abscissa difference value, correcting the actually-measured color based on the illumination adjustment value; returning to step S100; and S404, calculating a sum of absolute values of illumination adjustment values of any two colors of the RGB for achieving the target color respectively when none of first value, the second value and the third value is equal to the first ratio of the ordinate difference value to the abscissa difference value to generate three sums of the absolute values; correcting the actually-measured color by choosing a smallest sum from the three sums of the absolute values, returning to step S100.

A terminal apparatus, comprising a processor, a memory, and a computer program stored in said memory and configured to be executed by the processor, wherein the above mentioned method for mixed color correction is implemented when the processor executes the computer program.

In various embodiments of the invention, the apparatus for realizing said method for mixed color correction can be computing devices such as computer, mobile phone, tablet PC, notebook, server, or the like. Said method for mixed color correction can be integrated as a function module in the apparatus for realizing said method for mixed color correction and executed by the apparatus for realizing said method for mixed color correction.

As for a method for mixed color correction, according to the color matching formula: $C(C) \equiv R(R)+G(G)+B(B)$, the matching color will be changed when the amount of RGB changes.

According to the chromaticity coordinates and the tristimulus values of 1931CIE standard colorimetric system, the chromaticity coordinates of the three colors are $R(x1, y1)$, $G(x2, y2)$ and $B(x3, y3)$, respectively, the illuminances of the three colors are E1, E2 and E3, respectively. The chromaticity coordinates of the mixed color of the three colors are given by:

$$x = x1 * \frac{1 + B2*C2*A2*B3*C3*A3}{1 + A2*C2 + A3*C3}$$

$$y = y1 * \frac{1 + C2 + C3}{1 + A2*C2 + A3*C3}$$

Wherein, $A2 = \frac{y1}{y2}$, $$A3 = \frac{y1}{y3},$$

$$B2 = \frac{x2}{x1},$$

$$B3 = \frac{x3}{x1},$$

$$C2 = \frac{E2}{E1} \text{ and}$$

$$C3 = \frac{E3}{E1};$$

Above formulas are the results under ideal state, and in fact there may be some deviations. Thus, it is necessary to adjust the mixed color by adjusting the illuminances of one or two colors.

1. Monochrome Correction Method:

(1) R color is selected for adjusting illuminance E1 thereof; the variation of illuminance E1 is $\Delta E1$, meanwhile E2 and E3 remain unchanged, so $$\frac{C3}{C2}$$

still remains unchanged, let $$K1 = \frac{C3}{C2},$$

the chromaticity coordinates after adjusting are x1', y1', so the variations of the chromaticity coordinates are given by $$\Delta x1 = x1' - x = \frac{x1 * \beta 1 * \Delta E1}{E2 * a1^2 + a1 * \Delta E1}$$

$$\Delta y1 = y1' - y = \frac{y1 * \beta 1' * \Delta E1}{E2 * a1^2 + a1 * \Delta E1}$$

Where $a1 = \frac{1}{C2} + A2 + K1*A3$, $\beta 1 = (B2-1)*A2 + (B3-1)*A3*K1$, $\beta 1' = 1 - A2 + K1 - K1*A3$;

The second ratio of the variations of the chromaticity coordinates is a fixed value Kr, which is not irrespective of the illuminance:

$$Kr = \frac{\Delta y1}{\Delta x1} = \frac{y1 * \beta1'}{x1 * \beta1} \quad (1)$$

Similarly, the variation of the illuminance ΔE1 can be calculated by determining the variation of Δx1 or Δy1:

$$\Delta E1 = -\frac{\Delta x1 * E2 * a1^2}{x1 * \beta1 + a1 * \Delta x1} \text{ or} \quad (2)$$

$$\Delta E1 = -\frac{\Delta y1 * E2 * a1^2}{y1 * \beta1' + a1 * \Delta y1}$$

(2) G color is selected for adjusting illuminance E2 thereof, the variation of illuminance E2 is ΔE2, meanwhile E1 and E3 remain unchanged, the chromaticity coordinates after adjusting are x2' and y2', so the variations of the chromaticity coordinates are given by $$\Delta x2 = x2' - x = \frac{x1 * \beta2 * (a2 - A2 * C2) * \Delta E2}{a2^2 * E1 + a2 * A2 * \Delta E2}$$

$$\Delta y2 = y2' - y = \frac{y1 * \beta2' * (a2 - A2 * C2) * \Delta E2}{a2^2 * E1 + a2 * A2 * \Delta E2}$$

Where $a2 = 1 + A3 * C3 + A2 * C2$, $\beta2 = B2 * A2 - K2 * A2$, $\beta2' = 1 - A2 * K2'$, $K2 = \frac{1 + A3 * B3 * C3}{1 + A3 * C3}$, $K2' = \frac{1 + C3}{1 + A3 * C3}$;

The second ratio of the variations of the chromaticity coordinates is a fixed value Kg, which is not irrespective of the illuminance $$Kg = \frac{\Delta y2}{\Delta x2} = \frac{y1 * \beta2'}{x1 * \beta2} \quad (3)$$

Similarly, the variations of the illuminance ΔE2 can be calculated by determining the variations of Δx2 or Δy2:

$$\Delta E2 = \frac{\Delta x2 * E1 * a2^2}{x1 * \beta2 * (a2 - A2 * C2) - a2 * A2 * \Delta x2} \text{ or} \quad (4)$$

$$\Delta E2 = \frac{\Delta y2 * E1 * a2^2}{y1 * \beta2' * (a2 - A2 * C2) - a2 * A2 * \Delta y2}$$

(3) G color is selected for adjusting illuminance E3 thereof; the variation of illuminance E3 is ΔE3, meanwhile E1 and E2 remain unchanged, the chromaticity coordinates after adjusting are x3' and y3', so the variations of the chromaticity coordinates are given by $$\Delta x3 = x3' - x = \frac{x1 * \beta3 * (a3 - A3 * C3) * \Delta E3}{a3^2 * E1 + a3 * A3 * \Delta E3}$$

$$\Delta y3 = y3' - y = \frac{y1 * \beta3' * (a3 - A3 * C3) * \Delta E3}{a3^2 * E1 + a3 * A3 * \Delta E3}$$

Where $a3 = 1 + A3 * C3 + A2 * C2$, $\beta3 = B3 * A3 - A3 * K3$, $\beta3' = 1 - A3 * K3'$, $K3 = \frac{1 + A2 * B2 * C2}{1 + A2 * C2}$, $K3' = \frac{1 + C2}{1 + A2 * C2}$;

The second ratio of the variations of the chromaticity coordinates is a fixed value Kb, which is not irrespective of the illuminance:

$$Kb = \frac{\Delta y3}{\Delta x3} = \frac{y1 * \beta3'}{x1 * \beta3} \quad (5)$$

Similarly, the variations of the illuminance ΔE3 can be calculated by determining the variations of Δx3 or Δy3:

$$\Delta E3 = \frac{\Delta x3 * E1 * a3^2}{x1 * \beta3 * (a3 - A3 * C3) - a3 * A3 * \Delta x3} \text{ or} \quad (6)$$

$$\Delta E3 = \frac{\Delta y3 * E1 * a3^2}{y1 * \beta3' * (a3 - A3 * C3) - a3 * A3 * \Delta y3}$$

In the abovementioned monochrome correction method, only one parameter of the chromaticity coordinates can be adjusted. Only when the first ratio of the variations of the chromaticity coordinates required for correcting is equal to the second value of Kr, Kg or Kb, the target color can be obtained by adjusting a single color. In other situations, illuminances of two colors should be adjusted at the same time to adjust and correct the chromaticity coordinates.

2. Two-Color Based Correction Methods.

It can be seen from the formulas above that there is one-to-one relationship between the variation of illuminance of a single color and the variations of chromaticity coordinates Δx and Δy. The mixed color is a superposition of three colors. In the situation of simultaneously adjusting the illuminances of the two or three colors and adjusting the illuminance of a single color and then superimpose them, the variations of the chromaticity coordinates of the mixed color are the same.

(1) RG-Based Correction.

R color and G color are selected for adjusting illuminance, of which the variations of illuminances are ΔEb1 and ΔEb2 respectively, and the chromaticity coordinates should be corrected by Δx and Δy, then Δx and Δy are given by $$\Delta x =$$

$$\Delta x1 + \Delta x2 = -\frac{x1 * \beta1 * \Delta Eb1}{E2 * a1^2 + a1 * \Delta Eb1} + \frac{x1 * \beta2 * (a2 - A2 * C2) * \Delta Eb2}{a2^2 * E1 + a2 * A2 * \Delta Eb2}$$

$$\Delta y = \Delta y1 + \Delta y2 =$$

$$-\frac{y1 * \beta1' * \Delta Eb1}{E2 * a1^2 + a1 * \Delta Eb1} + \frac{y1 * \beta2' * (a2 - A2 * C2) * \Delta E2}{a2^2 * E1 + a2 * A2 * \Delta Eb2}$$

There are only two variables in above formulas: ΔEb1 and ΔEb2, so ΔEb1 and ΔEb2 can be figured out by:

$$\Delta Eb1 = -\frac{f(\Delta Eb1)*a1^2*E2}{x1*\beta1 + f(\Delta Eb1)*a1} \quad (7)$$

$$\Delta Eb2 = \frac{f(\Delta Eb2)*a2^2*E1}{x1*\beta2*(a2-A2*C2) - f(\Delta Eb2)*a2*A2} \quad (8)$$

Where $f(\Delta Eb1) = \frac{\Delta y - \Delta x * Kg}{Kr - Kg}$, $f(\Delta Eb2) = \frac{\Delta y - \Delta x * Kr}{Kg - Kr}$;

So ΔEb1 and ΔEb2 can be calculated by above formulas. By adjusting illuminances of the R color and G color by ΔEb1 and ΔEb2, respectively, the chromaticity coordinates can be corrected by the required Δx and Δy.

(2) RB-Based Correction.

R color and B color are selected for adjusting illuminance, of which the variations of illuminances are ΔEg1 and ΔEg3 respectively; the chromaticity coordinates can be corrected by Δx and Δy, then Δx and Δy are given by $$\Delta Eg1 = -\frac{f(\Delta Eg1)*a1^2*E2}{x1*\beta1 + f(\Delta Eg1)*a1} \quad (9)$$

$$\Delta Eg3 = \frac{f(\Delta Eg3)*a3^2*E1}{x1*\beta3*(a3-A3*C3) - f(\Delta Eg3)*a3*A3} \quad (10)$$

Where $f(\Delta Eg1) = \frac{\Delta y - \Delta x * Kb}{Kr - Kb}$, $f(\Delta Eg3) = \frac{\Delta y - \Delta x * Kr}{Kb - Kr}$;

So ΔEg1 and ΔEg3 can be calculated by above formulas. By adjusting illuminances of the R color and B color by ΔEg1 and ΔEg3, respectively, the chromaticity coordinates can be corrected by the required Δx and Δy.

(3) GB-Based Correction.

G color and B color are selected for adjusting illuminance, of which the variations of illuminances are ΔEr2 and ΔEr3 respectively; the chromaticity coordinates can be corrected by Δx and Δy, then Δx and Δy are given by:

$$\Delta Er2 = \frac{f(\Delta Er2)*a2^2*E1}{x1*\beta2*(a2-A2*C2) - f(\Delta Er2)*a2*A2} \quad (11)$$

$$\Delta Er3 = \frac{f(\Delta Er3)*a3^2*E1}{x1*\beta3*(a3-A3*C3) - f(\Delta Er3)*a3*A3} \quad (12)$$

Where $f(\Delta Er2) = \frac{\Delta y - \Delta x * Kb}{Kg - Kb}$, $f(\Delta Er3) = \frac{\Delta y - \Delta x * Kg}{Kb - Kg}$;

So ΔEr2, ΔEr3 can be calculated by above formulas. By adjusting illuminances of the R color and B color by ΔEr2, ΔEr3, respectively, the chromaticity coordinates can be corrected by the required Δx, Δy.

The chromaticity coordinates can be effectively corrected by the required Δx, Δy in the above three methods. The specific method selected for adjusting the results depends on the calculation result. Generally, the specific method with the minimum value of ΔE (sum of absolute values of variations of illuminances of two colors) is selected. There may be some errors after the first correction, so repeated corrections through the same methods as described above are necessary until the error is within a required range.

The specific steps of the adjustment and correction method are as follows:

(1) determining the chromaticity coordinates of RGB as (x1, y1), (x2, y2) and (x3, y3), the illuminance thereof as E1, E2 and E3, and the chromaticity coordinates of the target color as (x, y);

(2) determining the chromaticity coordinates of the current color: (x', y');

(3) calculating the variations of chromaticity coordinates for adjusting as Δx, Δy, and judging whether the value of Δx, Δy are within the required range which generally is ±0.002; if it meets the requirements, it is no need to perform correcting, otherwise the next step of the correction will be implemented;

(4) judging whether the first ratio Δy/Δx is equal to Kr, Kg or Kb, if equal, then selecting the monochrome correction method to perform correcting, turning to step (5); otherwise selecting the two-color based correction methods to perform correcting, turning to step (6);

(5) calculating the required illuminance adjustment value Δ E by the monochrome correction formula (2), (4) or (6);

(6) calculating the illuminance adjustment values according to the three two-color based correction methods respectively as ΔEb1, ΔEb2; ΔEg1, ΔEg3; ΔEr2, ΔEr3 by formula (7)-(12) respectively, comparing the absolute values of illuminance adjustment values according to the three methods as (\|ΔEb1|, |ΔEb2|, |ΔEg1|, |ΔEg3|, |ΔEr2|, |ΔEr3|)\, and selecting the method with the minimum value of the sum of absolute values to perform correcting;

(7) adjusting the illuminance/illuminances according to the selected correction method and corresponding calculation results, and reacquiring the chromaticity coordinates of the mixed color: (x", y"), repeating above mentioned monochrome correction method or two-color based correction methods until the correction meets the requirements.

The current color can be quickly adjusted to achieve the target color through the above calculation and correction steps. The color consistency can be realized. The calculation process can be accomplished by a computer, which is simple, fast, and convenient.

The aforementioned methods for mixed color correction of the present invention, as well as additional objects and advantages thereof, will be more fully understood herein by taking the RGB mixed target color (0.2807, 0.2884) as an example, the example comprising the following steps:

(1) determining chromaticity coordinates of the RGB as (0.7172, 0.2982), (0.1359, 0.6903) and (0.1492, 0.0211) respectively, the illuminances thereof as E1=900 lx, E2=1600 lx and E3=250 lx;

(2) determining the chromaticity coordinates of the current color as (0.2471, 0.1605);

(3) calculating the variations of the chromaticity coordinates for adjusting as Δx=0.0336 and Δy=0.1279, then judging whether the values of Δx and Δy are within the required range which generally is ±0.002, turning to the next correction step ff it does not meet the requirements;

(4) calculating Δy/Δx as 3.8065, and further obtaining Kr=0.29, Kg=−4.77, Kb=1.42 according to the formula (1), (3), (5) respectively, selecting the two-color based correction methods since the first ratio Δy/Δx is not equal to Kr, Kg or Kb;

(5) calculating the illuminance adjustment values in the three two-color based correction methods respectively by formula (7)-(12), of which the calculated results are ΔEb1=706, ΔEb2=3148; ΔEg1=−675 and ΔEg3=−187; ΔEr2=1566 and ΔEr3=−117. selecting RB-based correction to perform correction since the calculation results prove that RB-based correction is the method with the smallest sum of absolute values of illuminance adjustment values;

(6) respectively reducing the illuminance of R color by 675 lx and the illuminance of B color by 187 lx, reacquiring the chromaticity coordinates of the mixed color as (0.2907, 0.3025);

(7) calculating the variations of the chromaticity coordinates for adjusting as Δx=−0.01 and Δy=−0.0142, turning to the next correction step since the values of Δx and Δy are not within the required range;

(8) calculating Δy/Δx as 1.42, Kr=0.29, Kg=−4.77, Kb=1.42 according to the formula (1), (3), (5) respectively, selecting the monochrome correction method to perform correcting since the first ratio Δy/Δx is equal to Kb;

(9) calculating the illuminance adjustment value of B color as A E3=41 lx by formula (6);

(10) increasing the illuminance of B color by 41 lx, reacquiring the chromaticity coordinates of the current mixed color as (0.2815, 0.2901);

(11) calculating the variations of the chromaticity coordinates for adjusting as Δx=0.0008 and Δy=0.0017, finishing the correction since the values of Δx and Δy are within the required range.

With reference to the FIGURE, a schematic view of the apparatus for realizing correction of mixed color according to present invention is shown. As shown in the FIGURE, the apparatus for mixed color correction includes at least one processor 11, such as CPU, at least one network interface 14 or other user interfaces 13, memory 15, at least one communication bus 12, which enables the communication link between these modules. Alternatively, the user interface 13 may include a USB interface or other standard interfaces and cable interfaces. The network interface 14 may optionally include a WI-FI interface or other wireless interfaces. Memory 15 may include a high-speed RAM memory, or may also comprise a non-volatile memory, such as at least one magnetic disk storage. Optionally, memory 15 may contain at least one storage device remote from the processor 11.

In some embodiments, memory 15 may store the following elements, such as executable module, data structure, or their subsets and extended sets:

operating system 151, comprises various system programs and is being used to provide basic services and process hardware-based tasks;

program 152.

specifically, processor 11 is used to call the program 152 stored in the memory 15, and perform the method for mixed color correction in accordance with the abovementioned embodiments.

In some exemplary embodiments of the present invention, said computer program can be divided into one or more modules/elements, said one or more modules/elements, which are stored in said memory, are executed by said processor to complete the present invention. Said one or more modules/elements may be a series of computer program instruction segments which are capable of carrying out a particular function, said instruction segments can be used to describe the execution process of said computer program in said apparatus for mixed color correction.

Said apparatus for mixed color correction may be computing devices such as desktop computers, notebooks, palmtops or cloud servers. Said apparatus for mixed color correction may include, but is not limited to, a processor, a memory. A person skilled in the art may understand that the schematic diagram is merely an example of the apparatus for mixed color correction. The schematic diagram does not limit the scope of the apparatus for mixed color correction, and the apparatus may include more components or fewer components than those in the FIGURE, some components may be combined, or different component may be used.

Said processor 11 may be a Central Processing Unit (CPU), or may also be other general-purpose processors, a digital Signal Processor (DSP), a application Specific Integrated Circuit (ASIC), a field-Programmable Gate Array (FPGA), or other programmable logic devices, a discrete gate or a transistor logic device, a discrete hardware component, or the like. The general-purpose processor may be a microprocessor, or may also be any other general processors or the like. The processor 11, which can connect different parts of the whole apparatus for quickly realize color mixing of any colors together by various interfaces and lines, is the control center of said apparatus for mixed color correction.

Said memory 15 may be configured to store said computer program and/or module, said processor 11 achieves various functions of said apparatus for mixed color correction by running or executing the computer program and/or module stored in said memory, and by calling the data stored in the memory. Said memory 15 may mainly include program area and data area. The program area may store an operating system, an application program required for at least one function (such as a sound playback function, an image playback function, etc), and the like; the data area may store the data that were generated according to the use of mobile phone (such as audio data, telephone book, etc). In addition, memory 15 may include high-speed random-access memory, or may also include nonvolatile memory, such as a hard disk, a memory, a pluggable hard disk, a smart media card (SMC), a secure digital card (SD card), a flash card, at least one disk storage device, a flash memory, or other volatile solid-state memory devices.

Wherein, said modules/elements that are integrated by the apparatus for mixed color correction can be stored in the readable storage medium of a computer if they are implemented in the form of software function unit and sold or used as an independent product. From this point of view, all or parts of the realization processes of said method in abovementioned embodiments of present invention may also be done with the related hardware instructed by the computer programs. Said computer programs can be stored in a computer-readable storage medium, and steps of the methods in abovementioned embodiments can be realized when the processor executes the computer program. Wherein, said computer program comprises computer program code, said computer program code may be in source code forms, object code forms, executable files or other intermediate forms, etc. Said computer readable medium may include: any entities or devices capable of carrying said computer program code, a recording medium, a USB flash disk, a mobile hard disk, a magnetic disk, a light disk, a computer storage, a read-only memory (ROM), a random access memory (RAM), an electrical carrier signal, an electrical signal or a software distribution medium, etc. It should be noted that the information contained in said computer readable medium may be properly increased or decreased according to the requirements of the legislation and the patent practice in a jurisdiction, for example, in some jurisdictions, computer readable medium does not comprise electrical carrier signal and electrical signal according to their legislation and patent practice.

In conclusion, in accordance with the method for mixed color correction according to the present invention, Since an unique color is defined by the chromaticity coordinates, the color is accurate, and the color consistency is guaranteed. Based on the known chromaticity coordinates of various monochrome and the chromaticity coordinate differences between the current color and the target color, the mixed color is more similar with the target color by calculating and adjusting the illuminance of one or two colors. Generally, the target color can be achieved by 2-3 calculations during the adjustment process, which is simple and fast.

What is claimed is:

1. A method for mixed color correction, wherein the method comprises:
   S100, receiving chromaticity coordinate information of a target color and a actually-measured color; calculating chromaticity coordinate differences between the target color and the actually-measured color, calculating a first ratio of an ordinate difference value to an abscissa difference value of the chromaticity coordinate differences, storing the chromaticity coordinate differences and the first ratio of the ordinate difference value to the abscissa difference value;
   S200, determining whether the chromaticity coordinate differences are within a pre-stored difference range;
   S300, terminating the correction when the chromaticity coordinate differences are within the pre-stored difference range;
   S400, performing steps S401-S404 below when at least one of the chromaticity coordinate differences is not within the pre-stored difference range;
   S401, calculating corresponding variations of chromaticity coordinates and a second ratio of an ordinate variation value to an abscissa variation value of the variations of the chromaticity coordinates respectively when an illuminance of each color of RGB is adjusted according to the received chromaticity coordinates and illuminances of the RGB of the actually-measured color; wherein, the second ratios of the ordinate values to the abscissa values of the variations of the chromaticity coordinates comprise a first value of R color, a second value of G color and a third value of B color;
   S402, comparing the first ratio of the ordinate difference value to the abscissa difference value with the first value, the second value and the third value respectively;
   S403, calculating an illumination adjustment value corresponding to an equal value for achieving the target color when at least one of the first value, the second value and the third value is equal to the first ratio of the ordinate difference value to the abscissa difference value, correcting the actually-measured color based on the illumination adjustment value; returning to step S100; and
   S404, calculating a sum of absolute values of illumination adjustment values of any two colors of the RGB for achieving the target color respectively when none of first value, the second value and the third value is equal to the first ratio of the ordinate difference value to the abscissa difference value to generate three sums of the absolute values; correcting the actually-measured color by choosing a smallest sum from the three sums of the absolute values , returning to step S100.

2. The method of claim 1, wherein the first value of the R color and the illumination adjustment value of the R color for achieving the target color are given as follows:

$$Kr = \frac{\Delta y1}{\Delta x1} = \frac{y1 * \beta1'}{x1 * \beta1}$$

$$\Delta E1 = -\frac{\Delta x1 * E2 * a1^2}{x1 * \beta1 + a1 * \Delta x1} \text{ or } \Delta E1 = -\frac{\Delta y1 * E2 * a1^2}{y1 * \beta1' + a1 * \Delta y1}$$

wherein Kr represents the first value, $\Delta E1$ represents the illumination adjustment value of the R color for achieving the target color; ($\Delta x1$, $\Delta y1$) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2), and B (E3);

$$\beta1' = 1 - A2 + K1 - K1*A3, \beta1 = (B2-1)*A2 + (B3-1)*A3*K1,$$

$$a1 = \frac{1}{C2} + A2 + K1*A3, A2 = \frac{y1}{y2}, A3 = \frac{y1}{y3},$$

$$B2 = \frac{x2}{x1}, B3 = \frac{x3}{x1}, K1 = \frac{C3}{C2}, C2 = \frac{E2}{E1} \text{ and } C3 = \frac{E3}{E1}.$$

3. The method of claim 2, wherein the second value of the G color and the illumination adjustment value of the G color for achieving the target color are given as follows:

$$Kg = \frac{\Delta y2}{\Delta x2} = \frac{y1 * \beta2'}{x1 * \beta2}$$

$$\Delta E2 = \frac{\Delta x2 * E1 * a2^2}{x1 * \beta2 * (a2 - A2*C2) - a2*A2*\Delta x2} \text{ or }$$

$$\Delta E2 = \frac{\Delta y2 * E1 * a2^2}{y1 * \beta2'(a2 - A2*C2) - a2*A2*\Delta y2}$$

wherein Kg represents the second value $\Delta E2$ represents the illumination adjustment value of the G color for achieving said target color: ($\Delta x2$, $\Delta y2$) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$\beta2' = 1 - A2*K2',$$

$$K2' = \frac{1+C3}{1+A3*C3};$$

wherein when color R and color G are selected for adjusting illuminances in step S404, the illumination adjustment values of the color R and color G are given as follows:

$$\Delta Eb1 = -\frac{f(\Delta Eb1)*a1^2*E2}{x1*\beta1 + f(\Delta Eb1)*a1}$$

$$\Delta Eb2 = \frac{f(\Delta Eb2)*a2^2*E1}{x1*\beta2*(a2 - A2*C2) - f(\Delta Eb2)*a2*A2}$$

wherein ΔEb1 represents an illumination adjustment value of the R color, ΔEb2 represents an illumination adjustment value of the G color, $$f(\Delta Eb1) = \frac{\Delta y - \Delta x * Kg}{Kr - Kg}, f(\Delta Eb2) = \frac{\Delta y - \Delta x * Kr}{Kg - Kr},$$

(Δx, Δy) represent variations of chromaticity coordinates required for adjusting between the target color and the actually-measured color, $$a1 = \frac{1}{C2} + A2 + K1 * A3,$$
$$\beta1 = (B2 - 1) * A2 + (B3 - 1) * A3 * K1,$$
$$a2 = 1 + A3 * C3 + A2 * C2,$$
$$\beta2 = B2 * A2 - K2 * A2,$$
$$A2 = \frac{y1}{y2},$$
$$A3 = \frac{y1}{y3},$$
$$B2 = \frac{x2}{x1},$$
$$B3 = \frac{x3}{x1},$$
$$K1 = \frac{C3}{C2},$$
$$C2 = \frac{E2}{E1},$$
$$C3 = \frac{E3}{E1} \text{ and }$$
$$K2 = \frac{1 + A3 * B3 * C3}{1 + A3 * C3}.$$

4. The method of claim 2, wherein the third value of B color and the illumination adjustment value of the B color for achieving the target color are given as follows:

$$Kb = \frac{\Delta y3}{\Delta x3} = \frac{y1 * \beta3'}{x1 * \beta3}$$

$$\Delta E3 = \frac{\Delta x3 * E1 * a3^2}{x1 * \beta3 * (a3 - A3 * C3) - a3 * A3 * \Delta x3} \text{ or }$$

$$\Delta E3 = \frac{\Delta y3 * E1 * a3^2}{y1 * \beta3' * (a3 - A3 * C3) - a3 * A3 * \Delta y3}$$

wherein Kb represents the third value, ΔE3 represents the illumination adjustment value of B color for achieving said target color; (Δx3, Δy3) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$\beta3' = 1 - A3 * K3',$$

-continued $$K3' = \frac{1 + C2}{1 + A2 * C2} \text{ and }$$

$$K3 = \frac{1 + A2 * B2 * C2}{1 + A2 * C2};$$

wherein when color R and color B are selected for adjusting illuminances in step S404, the illumination adjustment values of the color R and color B are given as follows:

$$\Delta Eg1 = -\frac{f(\Delta Eg1) * a1^2 * E2}{x1 * \beta1 + f(\Delta Eg1) * a1}$$

$$\Delta Eg3 = \frac{f(\Delta Eg3) * a3^2 * E1}{x1 * \beta3 * (a3 - A3 * C3) - f(\Delta Eg3) * a3 * A3}$$

wherein ΔEg1 represents an illumination adjustment value of the R color, ΔEg3 represents an illumination adjustment value of the B color, $$f(\Delta Eg1) = \frac{\Delta y - \Delta x * Kb}{Kr - Kb}, f(\Delta Eg3) = \frac{\Delta y - \Delta x * Kr}{Kb - Kr},$$

(Δx, Δy) represent variations of chromaticity coordinates required for adjusting between the target color and the actually-measured color;

$$a1 = \frac{1}{C2} + A2 + K1 * A3, a3 = 1 + A3 * C3 + A2 * C2,$$
$$\beta1 = (B2 - 1) * A2 + (B3 - 1) * A3 * K1,$$
$$\beta3 = B3 * A3 - A3 * K3, A2 = \frac{y1}{y2}, A3 = \frac{y1}{y3},$$
$$B2 = \frac{x2}{x1}, B3 = \frac{x3}{x1}, K1 = \frac{C3}{C2}, C2 = \frac{E2}{E1} \text{ and } C3 = \frac{E3}{E1}.$$

5. The method of claim 1, wherein the second value of the G color and the illumination adjustment value of the G color for achieving the target color are given as follows:

$$Kg = \frac{\Delta y2}{\Delta x2} = \frac{y1 * \beta2'}{x1 * \beta2}$$

$$\Delta E2 = \frac{\Delta x2 * E1 * a2^2}{x1 * \beta2 * (a2 - A2 * C2) - a2 * A2 * \Delta x2} \text{ or }$$

$$\Delta E2 = \frac{\Delta y2 * E1 * a2^2}{y1 * \beta2' * (a2 - A2 * C2) - a2 * A2 * \Delta y2}$$

wherein Kg represents the second value, ΔE2 represents the illumination adjustment value of the G color for achieving said target color; (Δx2, Δy2) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$A2 = \frac{y1}{y2}, A3 = \frac{y1}{y3}, B2 = \frac{x2}{x1}, B3 = \frac{x3}{x1}, C2 = \frac{E2}{E1}, C3 = \frac{E3}{E1},$$

$$\beta2' = 1 - A2*K2', \beta2 = B2*A2 - K2*A2,$$

$$a2 = 1 + A3*C3 + A2*C2, K2 = \frac{1 + A3*B3*C3}{1 + A3*C3},$$

$$K2' = \frac{1 + C3}{1 + A3*C3} \text{ and } K1 = \frac{C3}{C2}.$$

6. The method of claim 5,
wherein the third value of B color and the illumination adjustment value of the B color for achieving the target color are given as follows:

$$Kb = \frac{\Delta y3}{\Delta x3} = \frac{y1*\beta3'}{x1*\beta3}$$

$$\Delta E3 = \frac{\Delta x3*E1*a3^2}{x1*\beta3*(a3 - A3*C3) - a3*A3*\Delta x3} \text{ or}$$

$$\Delta E3 = \frac{\Delta y3*E1*a3^2}{y1*\beta3'*(a3 - A3*C3) - a3*A3*\Delta y3}$$

wherein Kb represents the third value, ΔE3 represents the illumination adjustment value of B color for achieving said target color; (Δx3, Δy3) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$\beta3' = 1 - A3*K3',$$

$$K3' = \frac{1 + C2}{1 + A2*C2};$$

wherein when color G and color B are selected for adjusting illuminances in step S404, the illumination adjustment values of the color R and color B are given as follows:

$$\Delta Er2 = \frac{f(\Delta Er2)*a2^2*E1}{x1*\beta2*(a2 - A2*C2) - f(\Delta Er2)*a2*A2}$$

$$\Delta Er3 = \frac{f(\Delta Er3)*a3^2*E1}{x1*\beta3*(a3 - A3*C3) - f(\Delta Er3)*a3*A3}$$

wherein, ΔEr2 represents an illumination adjustment value of the G color, ΔEr3 represents an illumination adjustment value of the B color, $$f(\Delta Er2) = \frac{\Delta y - \Delta x*Kb}{Kg - Kb}, f(\Delta Er3) = \frac{\Delta y - \Delta x*Kg}{Kb - Kg},$$

(Δx, Δy) represent variations of chromaticity coordinates required for adjusting between the target color and the actually-measured color;

$$a2 = 1 + A3*C3 + A2*C2, a3 = 1 + A3*C3 + A2*C2,$$

$$\beta2 = B2*A2 - K2*A2, \beta3 = B3*A3 - A3*K3,$$

$$A2 = \frac{y1}{y2}, A3 = \frac{y1}{y3}, B2 = \frac{x2}{x1}, B3 = \frac{x3}{x1}, K1 = \frac{C3}{C2},$$

$$C2 = \frac{E2}{E1}, C3 = \frac{E3}{E1} \text{ and } K3 = \frac{1 + A2*B2*C2}{1 + A2*C2}.$$

7. The method of claim 1, wherein the third value of B color and the illumination adjustment value of the B color for achieving the target color are given as follows:

$$Kb = \frac{\Delta y3}{\Delta x3} = \frac{y1*\beta3'}{x1*\beta3}$$

$$\Delta E3 = \frac{\Delta x3*E1*a3^2}{x1*\beta3*(a3 - A3*C3) - a3*A3*\Delta x3} \text{ or}$$

$$\Delta E3 = \frac{\Delta y3*E1*a3^2}{y1*\beta3'*(a3 - A3*C3) - a3*A3*\Delta y3}$$

wherein Kb represents the third value, ΔE3 represents the illumination adjustment value of B color for achieving said target color; (Δx3, Δy3) are the variations of the chromaticity coordinates required for adjusting between the target color and the actually-measured color; the chromaticity coordinates before adjusting the illuminance are R (x1, y1), G (x2, y2) and B (x3, y3), the illuminances before adjusting the illuminance are R (E1), G (E2) and B (E3);

$$A2 = \frac{y1}{y2}, A3 = \frac{y1}{y3}, B2 = \frac{x2}{x1}, B3 = \frac{x3}{x1}, C2 = \frac{E2}{E1}, C3 = \frac{E3}{E1},$$

$$\beta3' = 1 - A3*K3', \beta3 = B3*A3 - A3*K3,$$

$$a3 = 1 + A3*C3 + A2*C2, K3' = \frac{1 + C2}{1 + A2*C2} \text{ and}$$

$$K3 = \frac{1 + A2*B2*C2}{1 + A2*C2}.$$

8. The method of claim 1, wherein the pre-stored range of the chromaticity coordinate difference stored in the second storage location is ±0.002.

9. A terminal apparatus, comprising a processor, a memory, and a computer program stored in said memory and configured to be executed by the processor, wherein the method for mixed color correction according to claims 1 is implemented when the processor executes the computer program.

* * * * *